United States Patent [19]
Ryder

[11] Patent Number: 5,987,640
[45] Date of Patent: Nov. 23, 1999

[54] VISOR AND EYESHIELD ASSEMBLY AND METHOD

[76] Inventor: Curtis J. Ryder, 9 Bitterblue La., San Antonio, Tex. 78218

[21] Appl. No.: 09/207,383

[22] Filed: Dec. 8, 1998

[51] Int. Cl.[6] .................................................... A42B 1/06
[52] U.S. Cl. ............................. 2/10; 2/209.13; 2/453; 351/155
[58] Field of Search ................... 2/6.3, 6.5, 6.7, 2/10, 209.13, 453; 351/155

[56] References Cited

U.S. PATENT DOCUMENTS

| | | |
|---|---|---|
| 1,696,198 | 12/1928 | Gross . |
| 1,833,741 | 11/1931 | Diehl . |
| 2,481,960 | 9/1949 | Wall et al. . |
| 2,500,280 | 3/1950 | Feldman . |
| 2,538,607 | 1/1951 | Vaca . |
| 2,538,608 | 1/1951 | Vaca . |
| 2,549,445 | 4/1951 | Friess . |
| 2,619,641 | 12/1952 | Vaca . |
| 2,648,091 | 8/1953 | Jones . |
| 2,654,089 | 10/1953 | Tannenbaum . |
| 2,725,560 | 12/1955 | Feldman . |
| 4,541,125 | 9/1985 | Phillips . |
| 4,819,274 | 4/1989 | Day . |
| 4,951,316 | 8/1990 | Moody . |
| 5,056,164 | 10/1991 | Lisle . |
| 5,129,102 | 7/1992 | Solo . |
| 5,261,124 | 11/1993 | Day . |
| 5,412,812 | 5/1995 | Gotchalian . |
| 5,533,207 | 7/1996 | Diaz . |
| 5,689,827 | 11/1997 | Ryder . |

FOREIGN PATENT DOCUMENTS

| | | |
|---|---|---|
| 158859 | 6/1952 | Australia . |

*Primary Examiner*—Diana Oleksa
*Attorney, Agent, or Firm*—Gunn, Lee & Keeling

[57] ABSTRACT

The present invention discloses a novel visor and eyeshield combination. This visor and eyeshield combination allows the wearer to adjust the eyeshield by flipping the eyeshield up to a rest position or down to an in-use position, by adjusting the distance of the eyeshield downward from the visor, by adjusting the distance of the eyeshield from to the wearer's face in order to accommodate eyeglasses and/or facial contours, and, in the preferred embodiment, by allowing the eyeshield to be flipped toward the wearer's face for a wraparound-look.

20 Claims, 4 Drawing Sheets

VISOR AND EYESHIELD ASSEMBLY AND METHOD

BACKGROUND OF THE INVENTION

1. Field of the Invention

Applicant's invention relates to a combination visor and eyeshield. More particularly, Applicant's invention relates to a visor and eyeshield assembly having at least three adjustment points.

2. Brief Description of the Prior Art

Using a visor to protect one's eyes from direct sunlight while simultaneously wearing a pair of sunglasses to protect one's eyes from indirect, reflected sunlight is not a new idea. In fact, many past inventions disclose a combination visor and eyeshield/sunglasses. The most basic of such combinations involve a pair of eyeshields attached to a visor. The eyeshield can be flipped up parallel to the visor into a rest position when not in use. When the user wants to protect his eyes, he simply flips the eyeshield downward so that the eyeshield is perpendicular to the visor. Previous patents using this combination visor and eyeshield mechanism and method include U.S. Pat. No. 1,696,198 to Gross; U.S. Pat. No. 1,833,741 to Diehl; U.S. Pat. No. 2,481,960 to Wall, et al.; U.S. Pat. No. 2,500,280 to Feldman; U.S. Pat. No. 5,412,812 to Gatchalian; U.S. Pat. No. 4,541,125 to Phillips; U.S. Pat. No. 5,689,827 to Ryder; and Australian Patent 158,859 to United-Carr Fastener Corporation.

The above disclosed patents do not fit well over the faces of people having especially pronounced facial contours or people who wear prescription eyeglasses. For those who wear eyeglasses, the eyeshield can never be completely flipped to the "down" position because the eyeglasses are in the way. It is well-known that different individuals have different facial contours. Some people have unusually beaky faces while others have unusually flat faces. Again, because a visor and eyeshield combination that can only be adjusted up or down cannot be moved closer to or farther away from one's face, the above inventions usually can only fit a few people comfortably.

In order to solve the above problems, others have made improvements to the combination visor and eyeshield patents disclosed above. In particular, patents such as U.S. Pat. No. 2,648,091 to Jones; U.S. Pat. No. 2,654,089 to Tannenbaum; U.S. Pat. No. 2,549,445 to Friess; U.S. Pat. No. 2,619,641 to Vaca; U.S. Pat. No. 4,819,274 to Day; and U.S. Pat. No. 5,261,124 to Day all disclose visor and eyeshield combinations that can be moved up or down and backwards and forwards.

Because the above inventions allow a user to both adjust the eyeshield towards or away from the wearer's face and flip the eyeshield up parallel against the visor or down perpendicular to the visor, they readily accommodate individuals wearing eyeglasses and individuals having different facial contours. However, the above inventions still use rather large and bulky eyeshields to protect the wearer's eyes.

Most hats/caps manufactured today are of the one-size-fits-all variety. Thus, the eyeshields disclosed in any one of the above patents must be large enough to cover the eyes of people requiring the largest of hat sizes (and so having larger, longer faces) and people requiring the smallest of hat sizes (and so having shorter, more compact faces). In addition, different people have different hat wearing habits- some people like to wear hats low over their forehead while others like to wear hats high over their forehead. Again, in order to accommodate everyone, the eyeshields must be large enough to protect the eyes of the wearer no matter how the wearer positions his hat.

However, today, people wear hats and sunglasses not only for protection from the sun's harmful rays. Many people wear hats and/or sunglasses as a fashion statement. In this fashion conscious environment, few people are willing to use large and bulky—and unfashionable—eyeshields to protect their eyes from sunlight.

Therefore, a new combination visor and eyeshield must be able to protect the eye from direct and indirect sunlight, accommodate eyeglass wearers, fit well for people having different facial contours, be able to accommodate those who wear different hat sizes, be able to accommodate those with different hat wearing habits, and be fashion sensitive.

Others have tried to solve one or some of the above problems with different versions of visor and eyeshield combinations. U.S. Pat. No. 2,538,607 to Vaca disclosed a visor and eyeshield combination that uses a push-button control to activate the eyeshield into its in-use position. This invention only protects the wearer from direct and indirect sunlight. It does not solve any one of the additional problems listed above.

U.S. Pat. No. 4,951,316 to Moody discloses a visor and eyeshield combination that can be adjusted parallel to the visor to fit the different contours of the wearer's face and to fit the eyeglasses possibly worn by the wearer. In addition to the backwards/forwards motion, the eyeshields can be removed from the visor. Therefore, different shaped eyeshields can be clipped onto the visor. This invention is impractical because the removable eyeshields can accidentally fall off the visor. Further, although this invention can be flexible to the fashion requirements of the day and can partially solve the problem with people having different hat sizes and requiring different sized eyeshields, it does not solve the problem with people sometimes wearing their caps high and sometimes wearing their caps low above their forehead. An additional disadvantage of this invention is that the removable eyeglasses cannot be flipped up or down. Therefore, when not in use, the eyeshield must be removed. This increases the chance of the eyeshield being misplaced and lost forever.

U.S. Pat. No. 5,056,164 to Lisle discloses a visor and eyeshield combination having a cloth flap attached to the visor to store and protect the eyeshield when the eyeshield is not in use. This invention also discloses removable and exchangeable eyeshields. Here, the eyeshield can be stored in a position parallel to the visor when not in use and flipped down to a position perpendicular to the visor when in use. Because the eyeshield is removable, this invention is also sensitive to the dictates of current fashion. However, because the eyeshield cannot be moved backwards and forwards in a direction parallel to the visor to adjust for those wearing eyeglasses and/or having different shaped facial contours, this invention once again does not solve all the problems listed above.

U.S. Pat. No. 5,129,102 to Solo discloses a visor and eyeshield combination having removable eyeshields and having eyeshields that can be flipped upward parallel to the visor for storage or flipped downward perpendicular to the visor for use. Once again, this invention does not solve all the problems listed above. As mentioned before, the removable eyeshield can be sensitive to the dictates of fashion. However, since the eyeshield can only be flipped up or down, it does not adequately accommodate those who wear eyeglasses, who have different facial contours, who wear different hat sizes, and/or who have different hat wearing habits.

Finally, U.S. Pat. No. 5,533,207 to Diaz discloses a visor and eyeshield combination in which the eyeshield is attached to an arm pivotally connected to the visor. By tracing the path of an arc of a circle, with the circle having the length of the arm as the radius, the arm can swing the eyeshield to a downward position perpendicular to the visor or swing the eyeshield to an upward position parallel to the visor. Therefore, moving the arm will simultaneously change the eyeshield's position both relative to the visor and relative to the distance from the wearer's face. Thus, this invention can accommodate people wearing eyeglasses, people having different facial contours, and people with different hat wearing habits. However, because the arm is rigid, it is possible that when the eyeshield is positioned in front of the wearer's eyes, the eyeshield is too far away from the wearer's face. Conversely, it is also possible that, when the eyeshield is positioned at a comfortable distance away from the wearer's face, it is no longer at eye level. Thus, the invention still does not solve all the problems associated with visor and eyeshield combinations.

SUMMARY OF THE INVENTION

It is an object of the present invention to provide a novel visor and eyeshield assembly and method for using the same to protect the wearer's eyes from both direct and reflected sunlight.

It is another object of the present invention to provide a visor and eyeshield assembly and method for using the same that can accommodate a wearer when the wearer is wearing eyeglasses.

It is another object of the present invention to provide a visor and eyeshield assembly and method for using the same in which the eyeshield can be adjusted relative to the visor to accommodate the different contours of the wearer's face.

It is another object of the present invention to provide a visor and eyeshield assembly and method for using the same where the eyeshield is adjustable to accommodate different hat wearing habits.

It is another object of the present invention to provide a visor and eyeshield assembly and method for using the same in which the eyeshield can be adjusted to accommodate the different facial lengths of the wearer.

Finally, it is another object of the present invention to provide a visor and eyeshield assembly and method for using the same in which the eyeshield can be shaped in the form and design of today's fashionable sunglasses yet fit correctly and comfortably over the wearer's eyes.

In satisfaction of these and related objectives, Applicant's present invention provides a visor and eyeshield assembly and method for using the same that will allow the wearer to lift the eyeshield up parallel to the visor in a rest position or flip the eyeshield down perpendicular to the visor for use; move the eyeshield in a direction parallel to the visor to accommodate those wearing prescription eyeglasses and/or having different facial contours; pull the entire eyeshield downward away from the visor to accommodate those having different facial lengths and/or hat wearing habits; and, for certain embodiments, being able to adjust the overall curvature of the eyeshield to achieve the currently fashionable wraparound-look in sunglasses. Applicant's invention allows a person to protect his eyes from direct and reflected sunlight while staying fashionable by providing a visor and eyeshield combination in which the eyeshield can be adjusted so that it fits correctly over the eyes without regard to the way the person likes to position the hat in relation to his face, without regard to the person's facial contours, without regard to the person's facial length, and without regard to whether the person is wearing eyeglasses.

Briefly described, Applicant's invention consists of a visor, a base, a sliding member, an arm, an attaching member, and an eyeshield. The visor can, but is not required to, be a part of a cap. A base having a first end and a second end is attached to the underside of the visor. The base has a generally U-shaped cross section, with the bottom of the "U" attached to the underside of the visor and the opening of the "U" facing downward. Two inwardly pointing flanges are attached generally perpendicularly to the two generally parallel arms of the "U."

A sliding member having a first end and a second end is slidably attached to the base. The inwardly pointing flanges of the base prevent the sliding member from detaching from the base. A design well-known in the art of slidably attached connectors is located at the second end of the base and first end of the sliding member so that, when acting in concert, they prevent the sliding member from accidentally sliding off and out of the base.

The sliding member, which has a first end and a second end, is generally flat and generally "T" shaped. The first end of the sliding member is located near the horizontal crossbar of the "T" while the second end of the sliding member is located near the bottom of the vertical crossbar of the "T." The sliding member has a generally rectangular cross-section when viewed from the front. Due to the construction of the second end of the base and the first end of the sliding member, the first end of the sliding member can never be slidably removed from the base.

An arm, also having a first end and a second end, is pivotally attached to the sliding member. More specifically, the second end of the sliding member is pivotally attached to the first end of the arm. The arm is generally flat and elongated. It is a rigid structure.

The second end of the arm is pivotally connected to an attaching member. The design and structure of this attaching member is well-known in the art of joint manufacture. The frame of the eyeshield, or, in an alternate embodiment, the eyeshield itself, is also attached to the attaching member at an end opposite the arm. In the preferred embodiment, the frame consists of a first lens brace and a second lens brace. The frame is connected to the attaching members in such a way as to allow the first and second lens braces to be bent towards the wearer's face. The construction of the above mentioned joint is well-known in the art of joint manufacture.

In the alternate embodiment, the attaching member is simply connected to the lenses without being first connected to the frame. In this embodiment, the lenses do not wrap around the face of the wearer.

A first lens is attached to the first lens brace; a second lens is attached to the second lens brace. The lenses are typical lenses used for sunglasses. They may be tinted.

To use the present invention, the distance between the eyeshield and the face of the wearer can be adjusted by moving the sliding member along the base. Therefore, the present invention can adequately accommodate those wearing eyeglasses and also people having different facial contours. In addition, the vertical distance between the eyeshield and the visor can be adjusted by moving the arm towards or away from the visor. This adjustment allows the eyeshield to be placed exactly at eye level without regard of the facial length and/or the tilt of the visor in relation to the face of the wearer. Further, this adjustment allows smaller, more fashionable eyewear to be used as the eyeshield of the present invention.

The attaching member located between the arm and the frame of the present invention can be flipped up so that the eyeshield is generally parallel to the visor or flipped down so that the eyeshield is generally perpendicular to the visor. When in use, the eyeshield is flipped down so that it is generally perpendicular to the visor.

In the preferred embodiment, the eyeshield is adjustable to wrap around the face of the wearer in accordance to the dictates of current fashion. To achieve the wraparound-look, the frame is bent towards the face of the wearer so that it forms an arc having the concave side facing the wearer and the convex side facing out.

While not in use, the present invention is tucked away underneath the visor. To store the eyeshield, the sliding member is first completely slid into the base so that the first end of the base is in contact with the first end of the sliding member. Thereafter, the arm is swung upward so that it rests parallel to the visor and behind the sliding member. Finally, the eyeshield is flipped upward to its rest position parallel to the visor. Additionally, in the preferred embodiment, the eyeshield is flattened against the visor for better storage.

DETAILED DESCRIPTION OF THE PREFERRED EMBODIMENT

Figure 1:
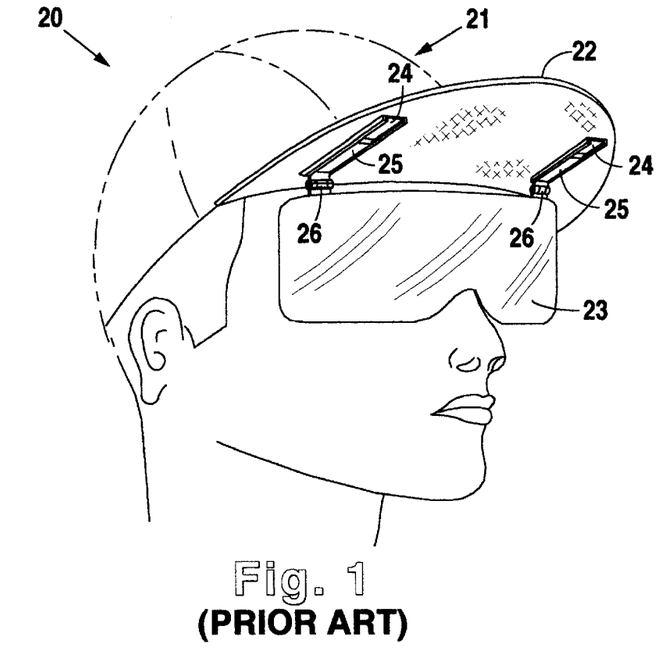
FIG. 1 is a perspective view of the prior art.

FIG. 1 shows a prior art visor and eyeshield assembly 20. Visor and eyeshield assembly 20 generally consists of an object, such as cap 21, used to secure visor 22 to the wearer's head; an eyeshield 23 used to protect the wearer's eyes from sunlight; and a mechanism securing eyeshield 23 to visor 22—here, in the form of base 24, sliding member 25, and pivot joints 26.

Although the illustration of prior art shown in FIG. 1 contains two pivot joints 26, it should be understood that some prior art use a single pivot joint to connect eyeshield 23 to visor 22. Further, some prior art do not allow eyeshield 23 to move in a direction parallel to visor 22 towards or away from the face of the wearer.

Figure 2:
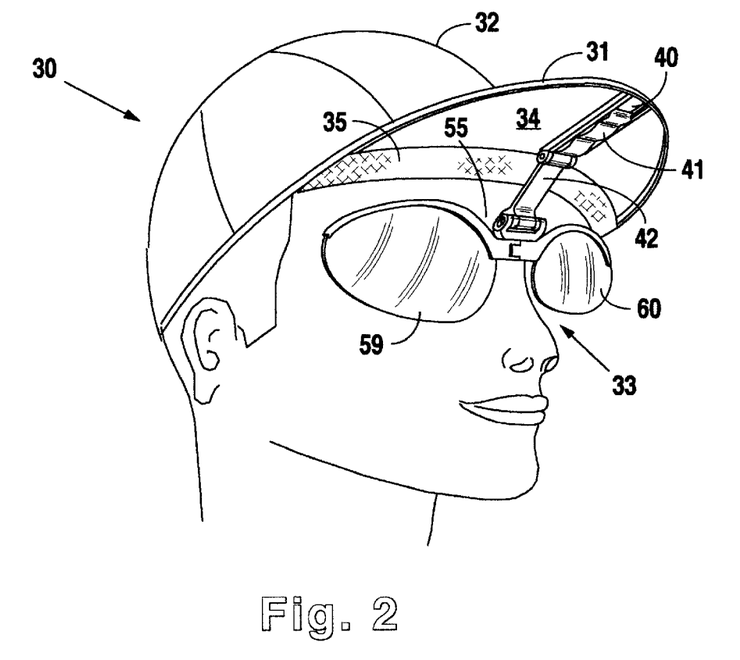
FIG. 2 is a perspective view of the preferred embodiment.

FIG. 2 is a perspective view of the preferred embodiment of the present invention, the visor and eyeshield assembly 30. Visor and eyeshield assembly 30 generally consists of a means to secure visor 31 to the wearer, here in the form of a cap 32; visor 31; eyeshield 33; and a series of mechanisms connecting visor 31 to eyeshield 33.

Cap 32 is a typical baseball cap found in today's marketplace. It can be made of any material typically used to make baseball caps and can be of a particular hat size or a one-size-fits-all baseball cap.

Visor 31 is attached generally perpendicularly to cap 32 in a place and using techniques well-known in the art of baseball cap making. Visor 31 has hard portion 34 attached to a soft portion 35. Soft portion 35 forms a band across the entire length of visor 31 so that the forehead of the wearer contacts with soft portion 35, but never contacts with hard portion 34. Hard portion 34 can be made of any hard but flexible material. In the preferred embodiment, hard portion 34 is made of a thin sheet of plastic. For aesthetic purposes, hard portion 34 can be covered by any material typically used to cover the outside of baseball caps or any other type of cap.

Hard portion 34 is a necessary element in the present invention because it protects eyeshield 33 when eyeshield 33 is tucked away underneath visor 31 in its stored position. Hard portion 34 protects eyeshield 33 from being bent out of shape if, for example, someone accidentally sits on visor 31.

However, hard portion 34 can dig into the forehead of the wearer and hurt the wearer when cap 32 is worn for a prolonged period of time. Therefore, a strip of soft material in the form of soft portion 35 is attached to hard portion 34. Soft portion 35 forms a strip along the area where visor 31 comes into contact with the forehead of the wearer. Soft portion 35 can be made of any material typically used to make baseball visors. Soft portion 35 is attached to hard portion 34 using any method typically used in the art of baseball cap making. Soft portion 35, along with hard portion 34, can be covered by any material typically used to cover baseball visors for aesthetic purposes.

Figure 3:
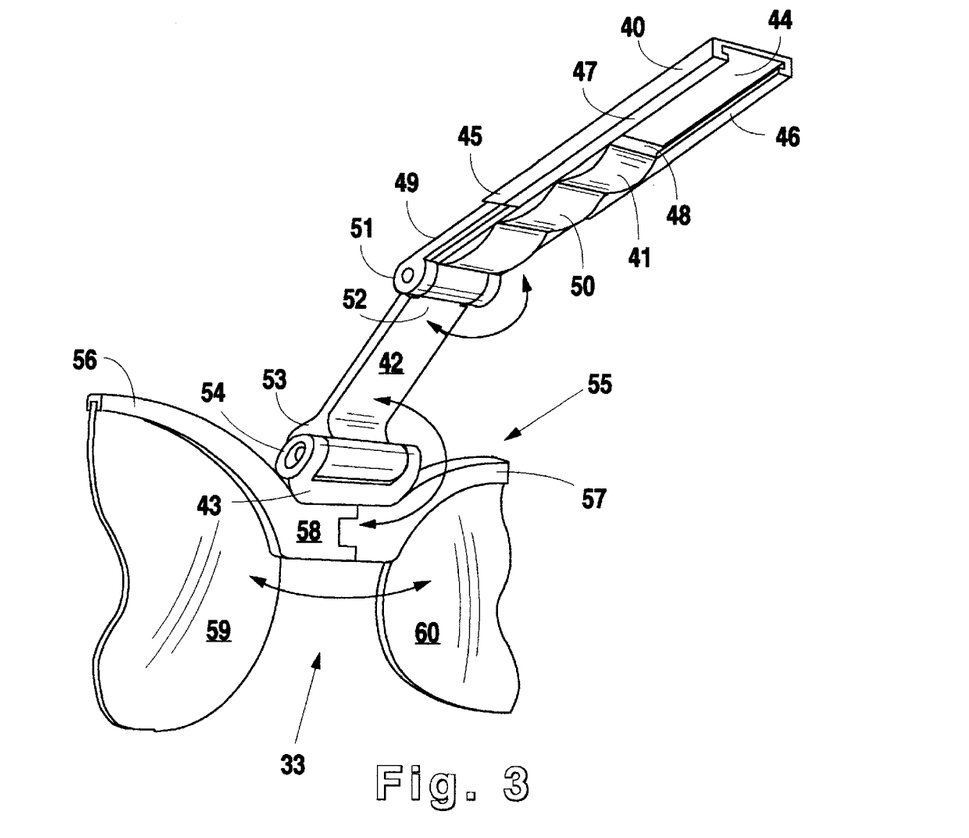
FIG. 3 is a close-up partial perspective view of the eyeshield and the mechanism by which the eyeshield is connected to the visor.

FIG. 3 shows a detailed perspective view of eyeshield 33 and the mechanism by which eyeshield 33 is attached to visor 31. The mechanism attaching eyeshield 33 to visor 31 generally consists of base 40, sliding member 41, arm 42, and attaching member 43.

Base 40 is a generally elongated enclosure having a first end 44 and second end 45. Base 40 is generally U-shaped in cross-section, with the bottom of the "U" attached to the underside of visor 31 and the opening of the "U" facing downward, away from visor 31. Flanges 46 and 47 are inwardly and generally perpendicularly attached to the generally parallel walls of the U-shaped base 40. Flange 46 and 47 are attached to base 40 in a manner well-known in the art of material treatment so as to form an integral part of base 40. Base 40 and flanges 46 and 47 can be made of any material strong enough to hold eyeshield 33 to the remainder of the mechanism used to attach eyeshield 33 to visor 31. In the preferred embodiment, base 40 is made of plastic.

Sliding member 41 is slidably connected to base 40. Flanges 46 and 47 prevent sliding member 41 from falling down and out of base 40. A mechanism well-known in the art of joint and connector manufacture is located at second end 45 of base 40 to prevent sliding member 41 from completely sliding off and out of base 40.

Figure 4:
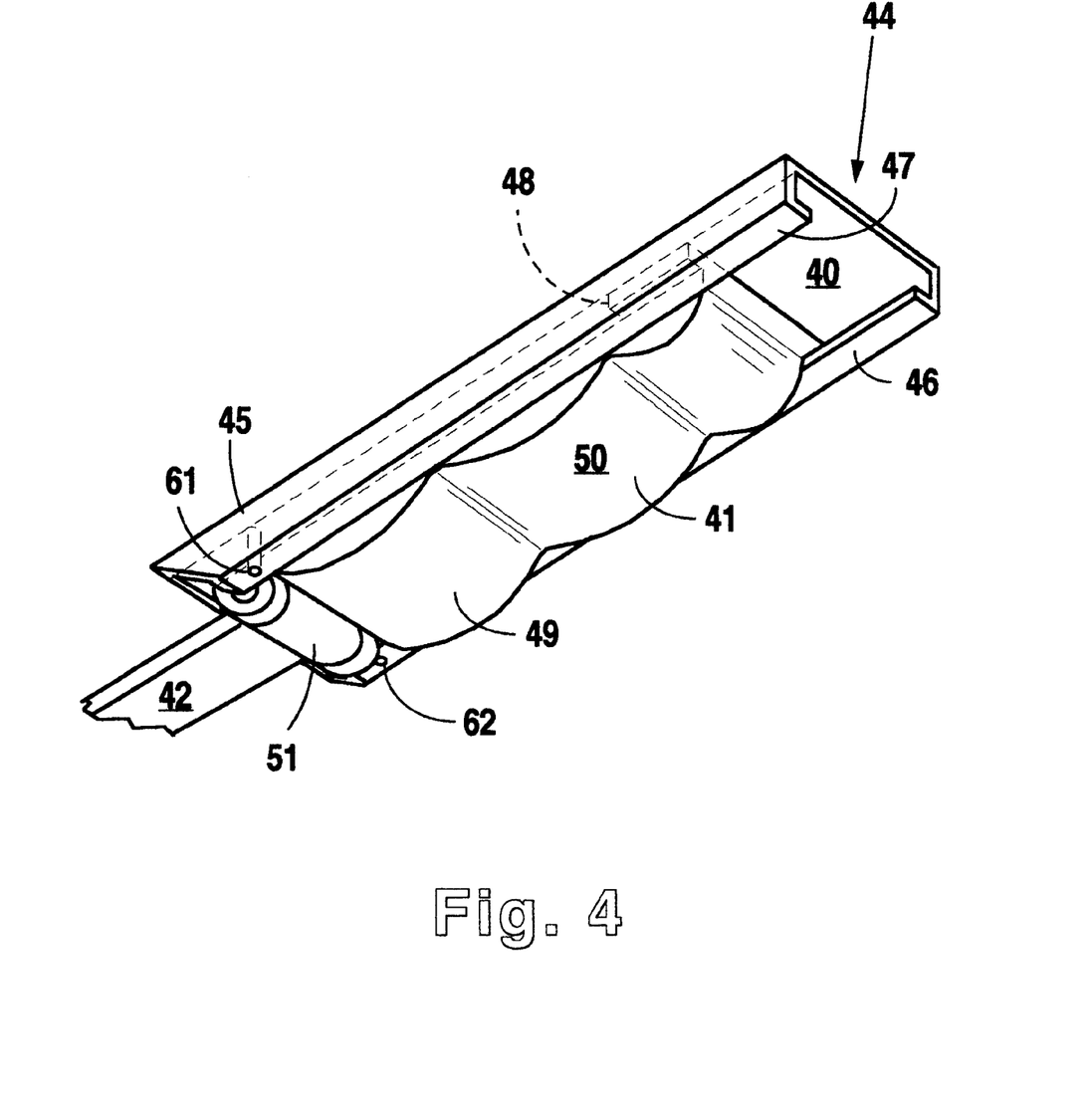
FIG. 4 is an enlarged perspective view of the base and the sliding member.

FIG. 4 is an enlarged perspective view of base 40 and sliding member 41. Sliding member 41 is generally elongated, flat, and "T" shaped. Sliding member has first end 48 and second end 49, with first end 48 near the horizontal crossbar of the "T" and second end 49 near the bottom vertical section of the "T." Sliding member 41 must be thin enough to slide into the space between flanges 46 and 47 and the bottom side of U-shaped base 40. Two rods, 61 and 62, are drilled through flanges 47 and 46, respectively, and into the bottom of the "U" of base 40 near second end 45 of base 40. Rods 61 and 62 prevent sliding member 41 from sliding out of base 40 by keeping the horizontal crossbar of the "T" of sliding member 41 inside base 40.

In the preferred embodiment, sliding member 41 also has finger ridges 50. Finger ridges 50 are located on sliding member 41 on the opposite side of the face of sliding member 41 that comes into contact with the bottom of the U-shaped portion of base 40. Finger ridges 50 are generally narrower in width than the entire width of sliding member 41 so that finger ridges 50 do not prevent sliding member 41 from slidably engaging base 40. Finger ridges 50 form ripples throughout the length of sliding member 41 so that the wearer can easily and more conveniently move sliding member 41 into and out of base 40. Although sliding member 50 is contemplated in the preferred embodiment, the present invention can work properly without finger ridges 50.

Referring back to FIG. 3, sliding member 41 is pivotally connected to arm 42 by joint A 51. A section of joint A 51 is an integral part of second end 49 of sliding member 41. Another section of joint A 51 is an integral part of first end 52 of arm 42. Joint A 51 is tight enough and provides enough friction to hold sliding member 41 and arm 42 at any angle in relation to each other. The precise mechanism of joint A 51 is well-known in the art of joint manufacture.

Arm 42 is a rigid beam having first end 52 and second end 53. Arm 42 can be made of any material-for example, metal or plastic-rigid enough to not to significantly deform under the weight of eyeshield 33. In the preferred embodiment, arm 42 is made of aluminum. In an alternate embodiment, arm 42 is made of plastic.

Second end 53 of arm 42 and attaching member 43 form joint B 54. Joint B 54 pivotally connects attaching member 43 to arm 42. The construction of joint B 54 is well-known in the art of joint manufacture and is similar in material and construction to joint A 51. Joint B 54 is tight enough and provides enough friction to hold arm 42 to attaching member 43 at any angle in relation to each other.

Attaching member 43 connects joint B 54 to eyeshield 33. Eyeshield 33 consists of frame 55, first lens 59, and second lens 60. Frame 55 has first lens brace 56 and second lens brace 57. First lens brace 56 is pivotally connected to second lens brace 57 at joint C 58. In turn, joint C 58 is movably connected to attaching member 43. Joint C 58 allows first lens brace 56 and second lens brace 57 to be bent towards the wearer's face to achieve the currently fashionable wraparound-look. The manufacture of joint C 58 is well-known in the art of joint manufacture.

First lens brace 56 and second lens brace 57 are mirror images of each other. Both first lens brace 56 and second lens brace 57 are simply the upper portions of frames for eyeglasses and can be readily found in the marketplace. Both first lens brace 56 and second lens brace 57 are thicker at joint C 58 where the frames are connected to each other and to attaching member 43. First lens brace 56 and second lens brace 57 grow thinner and taper off at the end farther from joint C 58. First lens brace 56 and second lens brace 57 can be made of any material that can hold first lens 59 and second lens 60 to their respective lens braces. In the preferred embodiment, first lens brace 56 and second lens brace 57 are made of aluminum.

In an alternate embodiment, the present invention is constructed without first lens brace 56, second lens brace 57, or joint C 58. In this alternate embodiment, first lens 59 and second lens 60 are simply connected to attaching member 43. Therefore, in this alternate embodiment, eyeshield 33 is not designed for the wraparound-look.

First lens 59 is attached to first lens brace 56; second lens 60 is attached to second lens brace 57. First lens 59 and second lens 60 can be made of any material used in manufacturing sunglasses and/or eyeshields. For example, first lens 59 and second lens 60 can be made of plastic or glass lenses. Also, first lens 59 and second lens 60 may be tinted.

Figure 5:
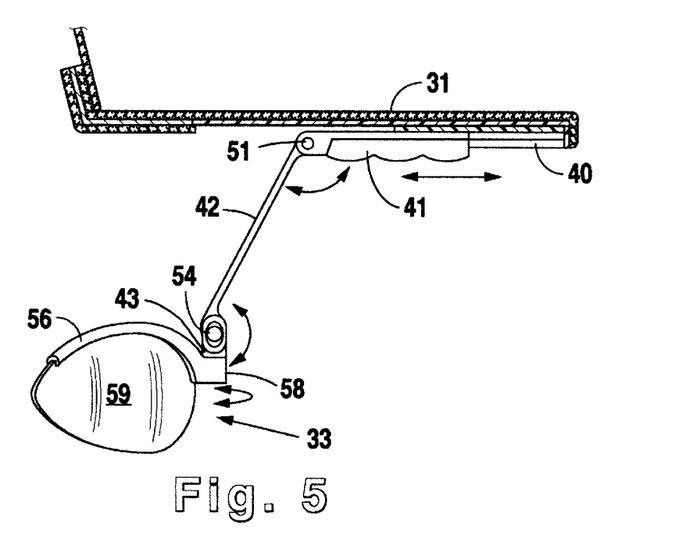
FIG. 5 is a side view of the visor and eyeshield assembly of the invention.

FIG. 5 shows the present invention in its extended, wearable position. Base 40 and sliding member 41 are slidably connected to each other so that eyeshield 33 can be moved towards or away from the face of the wearer to adjust for eyeglasses and/or facial contours. Joint A 51 allows arm 42 to be lowered and/or raised to adjust for the facial length of the wearer and to allow eyeshield 33 to be stowed away underneath visor 31 when not in use. Joint B 54 pivotally connects arm 42 to attaching member 43 so that eyeshield 33 can be pivoted upward to a storage position when eyeshield 33 is not in use. Finally, joint C 58 allows first lens 59 and second lens 60 to be flipped back towards the face of the wearer to achieve the wraparound-look. Joint C 58 does not appear in the alternate embodiment of the present invention.

Figure 6:
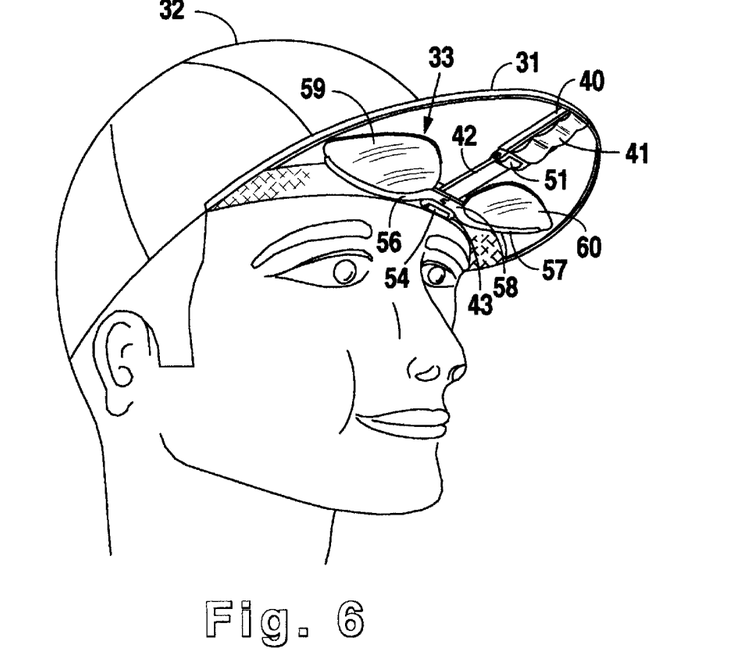
FIG. 6 is a perspective view of the visor and eyeshield assembly in which the eyeshield is tucked away in its stow-away position.

FIG. 6 shows the present invention in its stowed away position underneath visor 31. Sliding member 41 is completely encased in base 40. Arm 42, pivotally connected to sliding member 41 through joint A 51, is pulled up so that it rests behind sliding member 41 and against visor 31 throughout the entire length of arm 42. Attaching member 43, pivotally connected to arm 42 through joint B 54, is flipped up so that it rests directly underneath arm 42. Eyeshield 33, consisting of first lens brace 56, second lens brace 57, first lens 59, and second lens 60, is flipped up so that it is parallel to the plane of visor 31. In the stowed position, first lens brace 56 and second lens brace 57 are closer to the face of the wearer than first lens 59 and second lens 60. Finally, first lens brace 56 and second lens brace 57, connected to attaching member 43 and connected to each other through joint C 58, are flattened against visor 31 by adjusting joint C 58.

Figure 7:
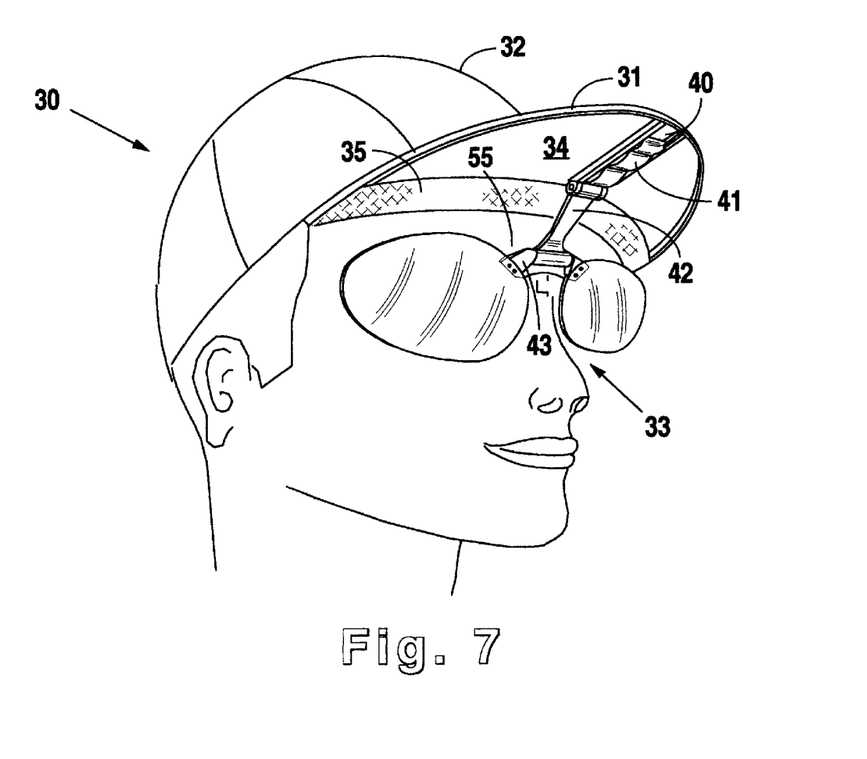
FIG. 7 is a perspective view of an alternate embodiment of the present invention.

FIG. 7 is a perspective view of the alternate embodiment of the present invention as being used. The alternate embodiment is similar to the preferred embodiment in every detail except that it lacks joint C 58, first lens brace 56, and second lens brace 57. Instead, eyeshield 33 is directly attached to attaching member 43.

Although the mechanism connecting visor 31 to eyeshield 33 described above contains only one base, one sliding member, one arm, and one attaching member, it should be understood that visor 31 can be connected to eyeshield 33 via a plurality of bases, sliding members, arms, and attaching members similar to base 40, sliding member 41, arm 42, and attaching member 43 described above. The precise manner with which the plurality of bases, sliding members, and arms are connected to visor 31 and eyeshield 33 is obvious to those skilled in the art.

In practice, the wearer places cap 32 having visor 31 on his head to protect himself from direct sunlight. When the wearer wishes to protect his eyes from indirect sunlight, he flips down eyeshield 33 from its rest position and pivots arm 42 downward from sliding member 41 while simultaneously adjusting the angle between arm 42 and attaching member 43 by using joint B 54. This movement adjusts the vertical distance of eyeshield 33 from visor 31 so that eyeshield 33 is lowered to the same horizontal plane as the wearer's eyes. Finally, sliding member 41 is slid out of base 40 so the wearer can adjust the distance of eyeshield 33 from the face of the wearer. The distance should be closer if the wearer is not wearing eyeglasses and the distance should be farther away, but immediately next to the eyeglasses, if the wearer wears prescription eyeglasses. In the preferred embodiment, first lens brace 56 and second lens brace 57 are then bent towards the face of the wearer for the fashionable wraparound-look.

When eyeshield 33 is no longer needed to protect the wearer from indirect reflected sunlight, eyeshield 33 can be stowed away underneath visor 31 by straightening out joint C 58 so that first lens brace 56 and second lens brace 57 no longer wrap around the face of the wearer. Thereafter, attaching member 43 is flipped up towards arm 42 by using joint B 54. At this point, first lens brace 56 and second lens brace 57 should be in a lower position than first lens 59 and second lens 60. Then, sliding member 41 is pushed into base 40 so that sliding member 41 rests inside and directly underneath base 40. Finally, arm 42 is placed behind sliding member 41 by straightening joint A 51 so that sliding member 41 and arm 42 lie in the same plane.

Although the invention has been described with reference to specific embodiments, this description is not meant to be construed in a limited sense. Various modifications of the disclosed embodiments, as well as alternative embodiments of the inventions, will become apparent to persons skilled in the art upon the reference to the description of the invention. It is, therefore, contemplated that the appended claims will cover such modifications that fall within the scope of the invention.

I claim:

1. A visor and eyeshield combination, comprising:
   a visor having a topside and an underside;
   at least one base connected to said underside of said visor, said base having a first end and a second end;
   at least one sliding member having a first end and a second end, said sliding member slidably connected to said base;
   at least one arm having a first end and a second end, said first end of said arm pivotally connected to said second end of said sliding member;
   at least one attaching member pivotally connected to said second end of said arm; and
   an eyeshield connected to said attaching member.

2. A visor and eyeshield combination as in claim 1 in which said eyeshield comprises:
   a frame attached to said attaching member; and
   a first lens and a second lens both attached to said frame.

3. A visor and eyeshield combination as in claim 2 in which said first lens and said second lens are tinted.

4. A visor and eyeshield combination as in claim 2 in which said frame comprises:
   a first lens brace; and
   a second lens brace, said first lens brace pivotally attached to said second lens brace.

5. A visor and eyeshield combination as in claim 1 where said second end of said base has a means for preventing said sliding member from sliding out of said base.

6. A visor and eyeshield combination as in claim 1 where said sliding member has at least one finger ridge for moving said sliding member.

7. A visor and eyeshield combination as in claim 1 where said eyeshield is has a first and second lens.

8. A visor and eyeshield combination as in claim 7 where said first lens and said second lens are tinted.

9. An eyeshield and eyeshield attachment device for attaching said eyeshield to a visor, comprising:
   at least one base;
   at least one sliding member having a first end and a second end, said sliding member slidably connected to said base;
   at least one arm having a first end and a second end, said first end of said arm pivotally connected to said second end of said sliding member;
   at least one attaching member pivotally connected to said second end of said arm; and
   an eyeshield connected to said attaching member.

10. A visor and eyeshield combination as in claim 9 in which said eyeshield comprises:
    a frame attached to said attaching member; and
    a first lens and a second lens both attached to said frame.

11. A visor and eyeshield combination as in claim 10 in which said first lens and said second lens are tinted.

12. A visor and eyeshield combination as in claim 10 in which said frame comprises:
    a first lens brace; and
    a second lens brace, said first lens brace pivotally attached to said second lens brace.

13. A visor and eyeshield combination as in claim 9 where said second end of said base has a means for preventing said sliding member from sliding out of said base.

14. A visor and eyeshield combination as in claim 9 where said sliding member has at least one finger ridge for moving said sliding member.

15. A visor and eyeshield combination as in claim 9 where said eyeshield has a first lens and a second lens.

16. A visor and eyeshield combination as in claim 15 where said first lens and said second lens are tinted.

17. A method of using a visor and eyeshield combination, comprising the steps of:
    placing a visor and eyeshield combination on a person's head, said visor and eyeshield combination comprising:
      a visor having a topside and an underside;
      at least one base connected to said underside of said visor, said base having a first end and a second end;
      at least one sliding member having a first end and a second end, said sliding member slidably connected to said base;
      at least one arm having a first end and a second end, said first end of said arm pivotally connected to said second end of said sliding member;
      at least one attaching member pivotally connected to said second end of said arm; and
      an eyeshield connected to said attaching member;
    flipping said eyeshield from a position parallel to said visor to a downward position perpendicular to said visor;
    adjusting an angle between said arm and said attaching member while pulling said arm downwardly away from said visor so that said eyeshield is lowered to the same horizontal plane as said person's eyes; and
    moving said sliding member out of said base to adjust the distance of said eyeshield from said person's face.

18. A method of using a visor and eyeshield combination as in claim 17 comprising the additional step of bending said eyeshield towards said person's face so said eyeshield wraps around said person's face.

19. A method of manufacturing of a visor and an eyeshield into a combined unitary structure to be worn by an individual, said method including the following steps:
    securing a base having a first end and a second end to an underside of said visor;
    slidably connecting a slide member with said base, said slide member having a pivot end and an anchor end;
    first pivotally connecting a visor end of an arm to said pivot end of said slide member;

second pivotally connecting an eyeshield end of said arm to an attaching member;

securing an eyeshield to said attaching member;

said combined unitary structure allowing for
- (a) parallel movement along said underside of said visor by said slidable connection;
- (b) rotation of said eyeshield from a generally horizontal to a generally vertical position by said second pivotal connection;
- (c) adjustment of said eyeshield to said individual's eyes by a combination of said first pivotal connection and of second pivotal connection and said arm therebetween.

20. The method of manufacturing as described in claim 19, including the further step of third pivotally connecting between separate eyeshields for each eye of said individual to allow pivotal movement between said separate eyeshields.

* * * * *